United States Patent
Alaria et al.

(10) Patent No.: US 8,208,389 B2
(45) Date of Patent: Jun. 26, 2012

(54) METHODS AND APPARATUS FOR IMPROVED DETERMINATION OF NETWORK METRICS

(75) Inventors: Valentina Alaria, San Francisco, CA (US); Silvano Gai, San Jose, CA (US); Thomas Edsall, Cupertino, CA (US); Varagur V. Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 537 days.

(21) Appl. No.: 11/490,806

(22) Filed: Jul. 20, 2006

(65) Prior Publication Data

US 2008/0019282 A1 Jan. 24, 2008

(51) Int. Cl.
*H04L 12/26* (2006.01)

(52) U.S. Cl. ........................... 370/252; 370/253

(58) Field of Classification Search .................. 370/252, 370/395.21, 238, 238.1
See application file for complete search history.

(56) References Cited

U.S. PATENT DOCUMENTS

| | | | |
|---|---|---|---|
| 5,987,011 A | 11/1999 | Toh | |
| 6,363,477 B1 * | 3/2002 | Fletcher et al. | 713/151 |
| 6,643,612 B1 | 11/2003 | Lahat et al. | |
| 6,839,858 B1 * | 1/2005 | James et al. | 713/400 |
| 2002/0150041 A1 * | 10/2002 | Reinshmidt et al. | 370/216 |
| 2003/0152034 A1 * | 8/2003 | Zhang et al. | 370/252 |
| 2003/0225549 A1 | 12/2003 | Shay | |
| 2004/0006705 A1 * | 1/2004 | Walker | 713/200 |
| 2005/0025129 A1 * | 2/2005 | Meier | 370/352 |
| 2005/0105474 A1 | 5/2005 | Metzler | |
| 2005/0111487 A1 | 5/2005 | Matta et al. | |
| 2005/0152406 A2 | 7/2005 | Chauveau | |
| 2005/0169188 A1 | 8/2005 | Cometto et al. | 370/249 |
| 2005/0286436 A1 | 12/2005 | Flask | |
| 2006/0104217 A1 | 5/2006 | Lehane | |
| 2006/0104218 A1 * | 5/2006 | Kako | 370/252 |
| 2006/0187900 A1 * | 8/2006 | Akbar | 370/352 |
| 2006/0274791 A1 * | 12/2006 | Garcia et al. | 370/508 |
| 2008/0117938 A1 * | 5/2008 | Erich et al. | 370/503 |

FOREIGN PATENT DOCUMENTS

| | | | |
|---|---|---|---|
| EP | 0 996 254 A2 | | 4/2000 |
| EP | 1 335 525 A2 | | 8/2003 |
| EP | 1 657 851 A1 | | 5/2006 |
| WO | WO2006063922 | * | 6/2006 |

OTHER PUBLICATIONS

PCT Search Report, PCT Application No. PCT/US07/15506, mailed Feb. 7, 2008.
PCT Written Opinion, PCT Application No. PCT/US07/15506, mailed Feb. 7, 2008.
Mahdavi, et al., "IPPM Metrics for Measuring Connectivity," RFC 2678, Sep. 1999, pp. 1-9.
J. Postel, "Internet Control Message Protocol, DARPA Internet Program Protocol Specification," RFC 792, Sep. 1981, pp. 1-15.
European Search Report dated Sep. 15, 2011, Application No. 07835987.4.

* cited by examiner

*Primary Examiner* — Huy Vu
*Assistant Examiner* — Omer Mian
(74) *Attorney, Agent, or Firm* — Weaver Austin Villeneuve and Sampson LLP

(57) ABSTRACT

A metric measurement mechanism is used to determine network characteristics such as latency and round trip time with more precision than that available from layer three metric measurement mechanisms. The metric measurement mechanism can use the same architecture used by layer three metric measurement mechanisms while more accurately measuring network latency and isolating network device processing delays.

17 Claims, 8 Drawing Sheets

```
0                               15                              31
+-+-+-+-+-+-+-+-+-+-+-+-+-+-+-+-+-+-+-+-+-+-+-+-+-+-+-+-+-+-+-+-+
| ver |D|F|L|V|R|  record_count | port_hop_count| applicat_data |
| 401 |  403    |      405      |      407      |      409      |
+-+-+-+-+-+-+-+-+-+-+-+-+-+-+-+-+-+-+-+-+-+-+-+-+-+-+-+-+-+-+-+-+
|                       streaming_time 415                      |
+                               +-+-+-+-+-+-+-+-+-+-+-+-+-+-+-+-+
|                               |             Scale 417         |
+-+-+-+-+-+-+-+-+-+-+-+-+-+-+-+-+-+-+-+-+-+-+-+-+-+-+-+-+-+-+-+-+
|            aut_Type 419       |                               |
+-+-+-+-+-+-+-+-+-+-+-+-+-+-+-+-+                               +
|                        Authentication 421                     |
+                               +-+-+-+-+-+-+-+-+-+-+-+-+-+-+-+-+
|                               |
+-+-+-+-+-+-+-+-+-+-+-+-+-+-+-+-+
```

Figure 4 Metric Measurement Header Format

```
0                             15                              31
+-+-+-+-+-+-+-+-+-+-+-+-+-+-+-+-+-+-+-+-+-+-+-+-+-+-+-+-+-+-+-+-+
|               0              |   Key ID     | Auth Data Len  |
|                              |     501      |      503       |
+-+-+-+-+-+-+-+-+-+-+-+-+-+-+-+-+-+-+-+-+-+-+-+-+-+-+-+-+-+-+-+-+
|                    Cryptographic sequence number              |
|                              511                              |
+-+-+-+-+-+-+-+-+-+-+-+-+-+-+-+-+-+-+-+-+-+-+-+-+-+-+-+-+-+-+-+-+
```

METHODS AND APPARATUS FOR IMPROVED DETERMINATION OF NETWORK METRICS

BACKGROUND OF THE INVENTION

1. Field of the Invention

The present invention generally relates to networking. More specifically, the present invention provides techniques and mechanisms for improved measurement of network diagnostic metrics.

2. Description of Related Art

There are a number of available metrics that can be used to roughly diagnose the health of a network. Latency is one metric that can be affected by a wide array of problems in the network including congestion, route flaps, non-optimal forwarding topologies, etc. However, because of the difficulty in synchronizing the clocks on two different network devices with sufficient precision, measuring one-way latency is typically not very useful.

Round trip time (RTT) is a commonly used networking metric for determining congestion between a source and a destination in a variety of networks. Networking tools and utilities allow a source to send data to a destination and the destination to respond to the source. The measured time between transmission of the data and receipt of the acknowledgment is referred to as the RTT. The RTT can be used by the source to estimate network congestion and latency between a source and a destination.

The RTT can also be used to set transmission rates at a source. For example, if the RTT is relatively small, a source may interpret it as an indication of reduced network congestion and elect a higher transmission rate.

Current mechanisms for determining network metrics such as latency and RTT have significant limitations. Consequently, it is desirable to provide techniques for improving the measurement of network metrics such as latency and RTT.

SUMMARY OF THE INVENTION

A metric measurement mechanism is used to determine network characteristics such as latency and round trip time with more precision than that available from layer three metric measurement mechanisms. The metric measurement mechanism can use the same architecture used by layer three metric measurement mechanisms while more accurately measuring network latency and isolating network device processing delays.

In one embodiment, a technique is provided for determining network metrics. A metric measurement message is received at a network device ingress port. Multiple timestamps are inserted into the metric measurement message. A first timestamp is inserted after the metric measurement message is received at the ingress port and a second timestamp is inserted after the first timestamp is inserted and before the metric measurement message is transmitted at an egress port. The timestamps are generated using a hardware clock associated with the network device.

In another embodiment, a network device is provided. The network device includes an ingress port, an egress port, and a timestamp mechanism. The timestamp mechanisms is operable to insert multiple timestamps into a metric measurement message after the metric measurement message is received at the ingress port and before the metric measurement message is transmitted at the egress port. The timestamps are generated using the hardware clock associated with the network device.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 4 is a graphical representation showing a metric measurement message format.

FIG. 5 is a graphical representation showing authentication information.

DETAILED DESCRIPTION OF SPECIFIC EMBODIMENTS

Figure 1:
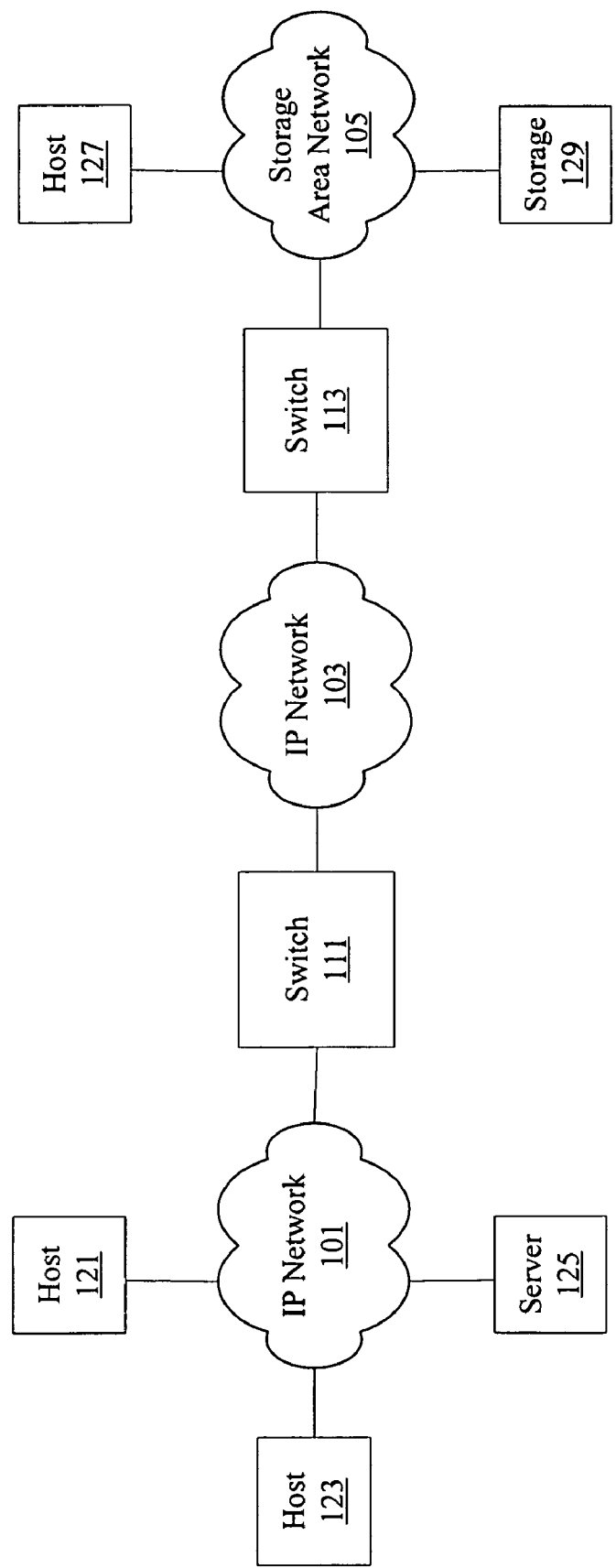
FIG. 1 is a diagrammatic representation showing network nodes that can use the techniques of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of packet networks. However, it should be noted that the techniques of the present invention can be applied to different variations and flavors of packet networks as well as to alternatives to packet networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

A wide variety of tools are available for measuring network metrics. Round trip time (RTT) is a metric used by a source to determine a variety of network characteristics, including congestion, latency, etc. Tools and utilities such as ping and traceroute measure the time required for a source to receive an acknowledgment from a destination after sending data to the destination. The Internet Control Message (ICMP) protocol is a layer three protocol designed to provide feedback about problems occurring within a network. Some of ICMP's function announce network errors, network congestion, assist troubleshooting, and announce timeouts. The Internet Protocol Performance Metrics (IPPM) provides a set of layer 3 standard metrics that can be applied to the quality, performance, and reliability of Internet data delivery services. These metrics are designed such that they can be performed by network operators, end users, or independent testing groups.

Other implementations rely on relatively expensive and complex methods to obtain precise information. Some precise metrics can be obtained by synchronizing clocks in separate network devices using a Global Positioning Satellite (GPS) system. Still others rely on switch processing to compute network metrics. Many conventional implementations either lack precision or are excessively expensive and complicated.

The techniques of the present invention recognize that it is relatively straightforward to obtain RTT estimates with precision limited only by the local clock at a source. For example, most processors provide a register that is automatically incremented every clock cycle. Processor and hardware based clocks can be used as very high resolution local clocks. Transmission of data and receipt of a corresponding acknowledgment from a destination are measured using clock cycles. All measurements can be performed in terms of clock cycles, and converted to a conventional time unit only when strictly necessary. Consequently, the techniques of the present invention focus on implementing metric measurement using metric messages at layer 2 instead of the conventional layer 3.

One of the differences between ICMP and the techniques of the present invention is that the techniques of the present invention use a layer 2 mechanism providing layer 2 hop by hop latency measurements and RTT estimation (and therefore includes layer 3 devices) while traditional ICMP uses a layer 3 mechanisms so only layer 3 devices are seen. Since frames are typically forwarded by hardware in modern layer 2 and layer 3 devices, metric measurement represents a more accurate measure of latency than those metrics that focus on packets.

Metric gathering messages may or may not be authenticated. According to various embodiments, a metric message header includes an authentication type field to protect the measurement and all records inserted. This prevents manipulation by unscrupulous users seeking additional bandwidth or working to congest a network with excess metric messages.

FIG. 1 is a diagrammatic representation showing a network topology that can use the techniques of the present invention. Although one particular network topology is shown, it should be recognized that the techniques of the present invention can be applied to a variety of IP and non-IP networks and network configurations including TCP improvements. In some examples, fibre channel protocols such as Remote Domain Loopback can use some of the techniques of the present invention. According to various embodiments, an IP network 101 includes hosts 121 and 123 along with server 125. The IP network 101 can also include multiple switches and routers. The IP network 101 is coupled to an IP network 103 through a gateway or switch 111. Storage area network 105 includes host 127, storage 129, as well as other fibre channel switches and gateway or switch 113. The switches 111 and 113 allow transmission of data between networks.

According to various embodiments, a switch 111 as well as other nodes have forward buffers for holding data for transmission from IP network 101 to storage area network 105. In some examples, the forward buffers may be full, causing delay at switch 111 for data transmitted from IP network 101 to storage area network 105. In other examples, reverse buffers may be full, causing delay at switch 111 for data transmitted from storage area network 105 to IP network 101. Round trip time is a rough metric that can estimate the amount of congestion in general. However, conventional mechanisms such as ICMP for determining metrics such as RTT are relatively imprecise, particularly for high transmission rate networks such as 10G networks.

Figure 2:
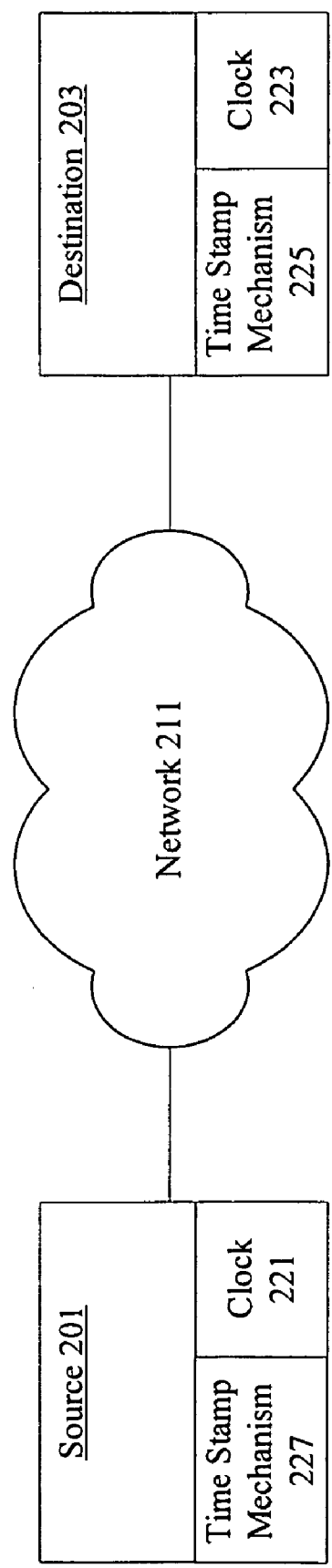
FIG. 2 is a diagrammatic representation showing a source and a destination.

FIG. 2 is a diagrammatic representation showing one example of a source node and a destination node. According to various embodiments, a source node 201 is connected to a destination node 203 over a network 211. The network 211 may include multiple switches, routers, subnetworks, etc. The source node 201 includes a clock. The destination node 203 includes a clock 223 and a timestamp mechanism 225. The source node 201 may also include a timestamp mechanism 227. In one embodiment, both the source node and the destination node insert timestamps into their generated frames, even though the source node may not use its own timestamps to perform precise round trip time.

According to various embodiments, a source node 201 tracks the time of transmission of a frame. The destination node 203 receives the frame. According to various embodiments, the destination node 203 includes a linecard that automatically inserts a timestamp at the moment a frame is received. The destination node 203 then performs some processing and sends a response to the linecard for transmission. The linecard inserts another timestamp before the frame is transmitted. According to various embodiments, the linecard uses its own internal clock to write timestamps. Consequently, when the source node 201 receives the response, the source node 201 can remove the processing time used by the destination node 203 from its calculation of RTT. In some other examples, a destination node 203 may only insert a single timestamp.

Figure 3:
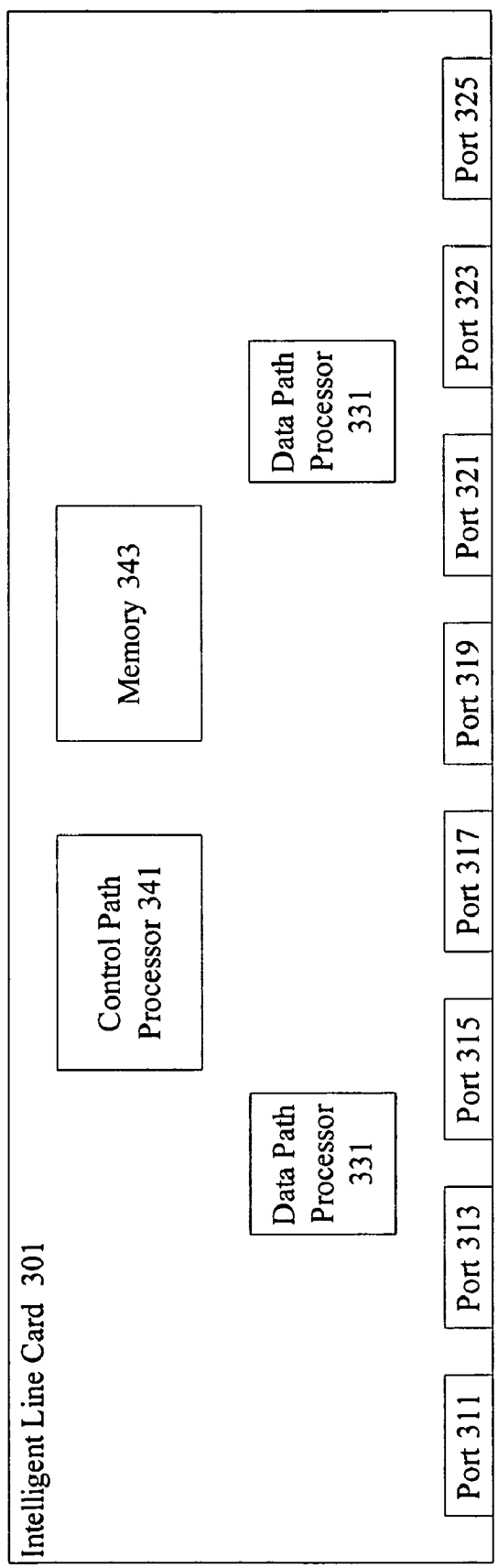
FIG. 3 is a graphical representation showing an intelligent line card.

FIG. 3 is a diagrammatic representation of one example of an intelligent line card. Although an intelligent line card is being described in the context of a fibre channel switch, the techniques of the present invention allow a variety of different pieces of hardware running different protocols to provide timestamp information. According to various embodiments, the intelligent line card includes ports 311-325, data path processors 331 and 333, control path processor 341, and memory 343. Data path processors 331 and 333 are used to identify flow information and exchange information and output the data to the appropriate fibre channel switch port. The control path processor 341 is used to handle management functions and exceptions. Memory 343 can be used to hold statistical data gathered by a data path processor. In one embodiment, 8 data path processors are provided for 32 ports.

Although separate data path and control path processors are provided, it should be noted that in some instances, a single processor may be used to handle network traffic and control functions and exceptions. In other examples, additional processors may be provided. Any line card having hardware support for fibre channel packet snooping is referred to herein as an intelligent line card.

FIG. 4 is a diagrammatic representation showing a metric measurement message format. Any layer 2 message used to determine network metrics is referred to herein as a metric measurement message. Although one particular metric measurement message format is described, it should be understood that a wide variety of metric measurement message format can be used. According to various embodiments, the metric measurement message includes a version 401 and multiple flags 403. In some embodiments, the multiple flags include a direction flag, a full flag, and a fixed length flag. The direction flag indicates the direction of the packet. In one example, when the packet is initiated, the direction bit is set to 0. When the port at the far end receives the frame and sends it back to the source, this bit is set to 1. The full flag indicates that the metric measurement message payload is full and further records can not be added. The fixed length flag indicates if the metric measurement packet needs to be padded to a minimum fixed size. The validity flag indicates if the metric measurement packet is carrying a timestamp valid for synchronization. A reserved flag remains for additional functionality. The record count 405 indicates the number of records in a metric measurement message.

A port hop count 407 is used to track the number of ports traversed. In one example, the port hop count 407 is decremented at each port. In a single switch, the port_hop_count is typically decremented twice, once at the ingress port and once at the egress port. In some embodiments, a timestamp is inserted each time the port hop count is decremented. For example, a timestamp is inserted at an ingress port and a timestamp is inserted at an egress port. According to various embodiments, the application data 409 is an opaque field meaningful to the originator. An example is to use it as a sequence number in estimating drop rate or to use it to force a specific path (e.g. Etherchannel, multipath). The streaming time 415 is a field recording the timestamp of the last port crossed by the metric measurement packet and can be used for synchronization purposes.

According to various embodiments, scale 417 is the resolution of each time unit of the streaming time. The resolution field can be in units of picoseconds. The auth type 419 identifies the type of authentication scheme used. The authentication field 421 includes information used by the authentication scheme. In one example, the authentication field 421 includes a hash of data associated with the metric measurement message.

According to various embodiments, timestamps are identified by the port inserting the timestamp. For example, an ingress port associated with a switch adds a timestamp and a port identifier. An egress port similarly adds a timestamp and a port identifier.

FIG. 5 is a diagrammatic representation showing cryptographic sequence information. A metric measurement message can be configured to include authentication information. In one example, a KeyID 501, an authentication data length 503, and a cryptographic sequence number 511 can be included. The cryptographic sequence number 511 can hold authentication sequences such as hash sequences to prevent unscrupulous users from undesirable activities such as flooding a network with excess metric measurement messages.

Figure 6:
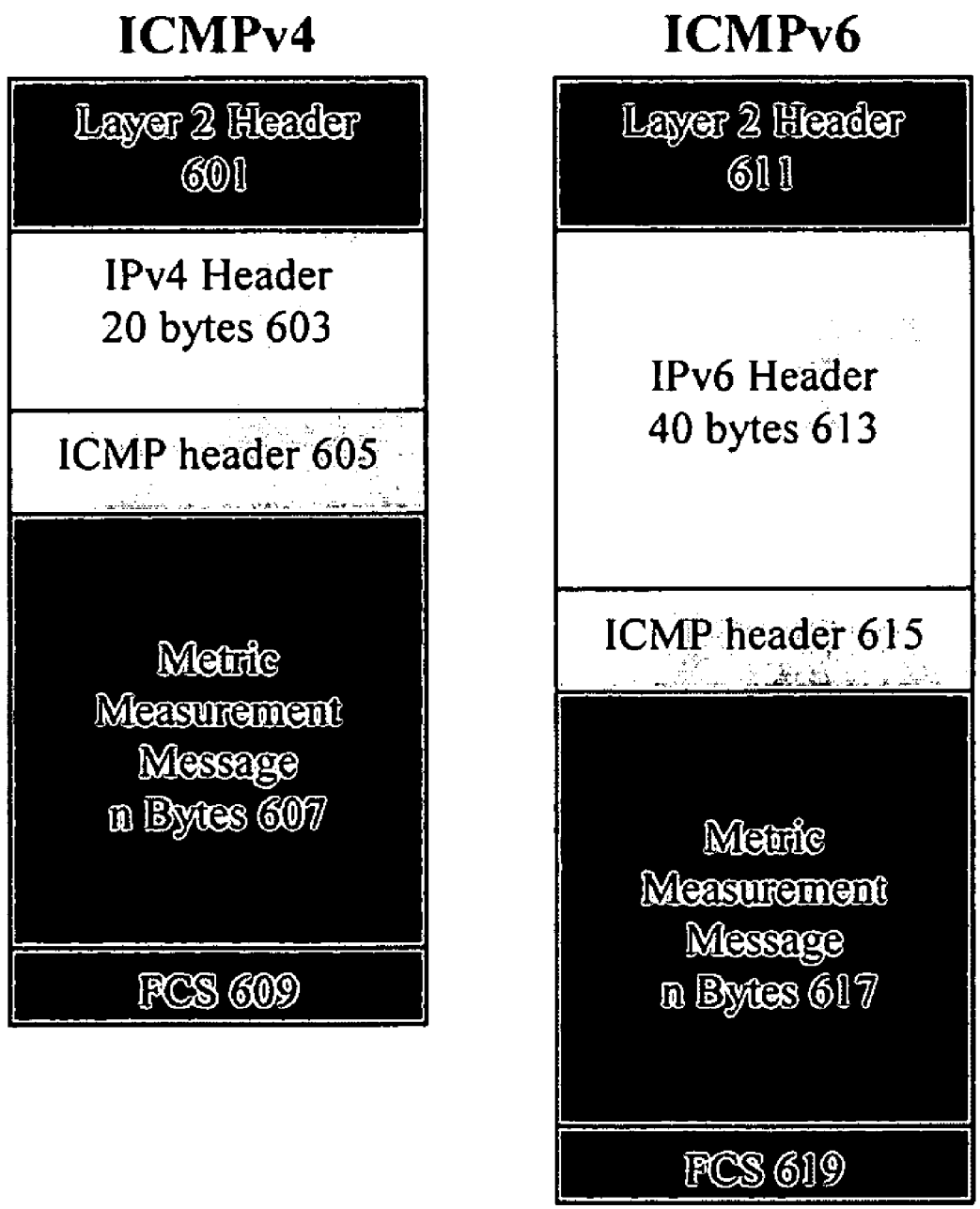
FIG. 6 is a diagrammatic representation showing a metric measurement message included in an ICMP packet.

FIG. 6 is a diagrammatic representation showing a metric message measurement included with an Internet Control Message Protocol (ICMP) message. ICMP is used with both IPv4 and IPv6. ICMP messages delivered in IP packets are related to network operation or misoperation. Of course, since ICMP uses IP, ICMP packet delivery is unreliable. The ICMP protocol is designed to provide feedback about problems occurring inside the network.

ICMP announces network errors, such as a host or entire portion of the network being unreachable, due to some type of failure. A TCP or UDP packet directed at a port number with no receiver attached is also reported via ICMP. ICMP announces network congestion. When a router begins buffering too many packets, due to an inability to transmit them as fast as they are being received, the router will generate ICMP Source Quench messages.

Source Quench messages slow the rate of packet transmission from a sender. However, generating too many Source Quench messages causes even more network congestion, so the messages are used sparingly.

ICMP supports an Echo function, which just sends a packet on a roundtrip between two hosts. Ping, a common network management tool, is based on this feature. Ping will transmit a series of packets, measuring average roundtrip times and computing loss percentages. ICMP also announces timeouts. If an IP packet's TTL field drops to zero, the router discarding the packet will often generate an ICMP packet announcing this fact. Trace-Route is a tool which maps network routes by sending packets with small TTL values and watching the ICMP timeout announcements.

ICMP provides a wide range of network measurement data, but ICMP packets are only processed by Layer 3 devices and oftentimes do not provide sufficient accuracy. According to various embodiments, it is recognized that to compute the real data-path latency, only data path elements such as hardware forwarding should be considered. To ensure that a metric measurement message traverses both L2 and L3 devices, it is provided that metric measurement messages be transported using existing ICMP messages. Consequently, the techniques of the present invention use much existing network architecture but allow for more precise network metric measurements. Consequently, ICMP messages are used to carry metric measurement messages.

According to various embodiments, a new type value both for ICMPv4 and ICMPv6 is defined and used to carry metric measurement messages. In some embodiments, devices supporting metric measurement messages carried in ICMP messages are capable of parsing an incoming frame, recognizing the metric measurement message, and performing further processing as needed. An ICMP version 4 message includes a layer 2 header 601, an IPv4 header 603, an ICMP header 605 and a frame check sequence 609. The metric measurement message 607 is encapsulated in the ICMP message. An ICMP version 6 message include a layer 2 header 611, an IPv6 header 613, an ICMP header 615, and a frame check sequence 619. The metric measurement message 617 is again encapsulated in the ICMP message.

Figure 7:
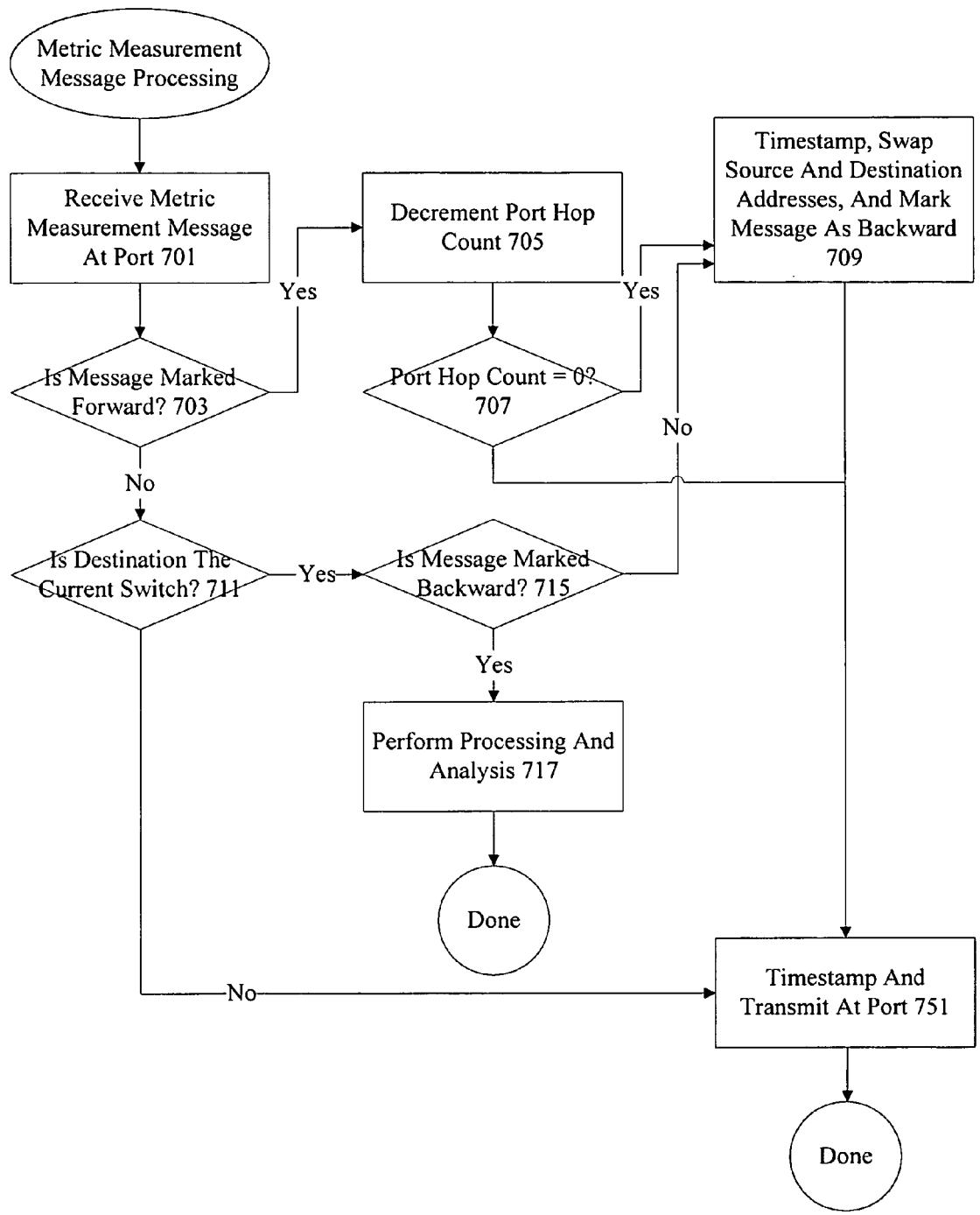
FIG. 7 is a flow process diagram showing one technique for metric measurement message processing.

FIG. 7 is a flow process diagram showing one technique for performing metric measurement message processing. It should be noted that a wide variety of processing can occur. At 701, a metric measurement message is received at an ingress port 701. It is determined at 703 if the message is marked forward. If the message is marked forward, the port hop count is decremented at 705. It is determined at 707 if the port hop count is 0. If the port hop count is 0 at 707, the message is timestamped, marked as backward, and the source and destination addresses are swapped to return the message to the originator. According to various embodiments, the message is then again timestamped and transmitted at egress port 751. The multiple timestamp can occur at line cards associated with ingress and egress ports. If the message is not marked as forward at 703, it is determined at 711 if the destination is the current switch. If the destination is the current switch, it is determined if the message is marked backward at 715. If the message is marked backward, that means that the message has returned to the originator and the originator can perform processing and analysis using timestamp information. If the message is not marked backward at 715, the message is timestamp and marked as backward and the source and destination addresses are swapped at 709. The message is then again timestamped and transmitted at egress port 751.

The following table shows various field that switches may or may not modify:

TABLE 1

Modifiable fields of a metric measurement message

| Header field name | Code 0 | Code 1 |
|---|---|---|
| Version | No | No |
| Direction Flag | Only endpoint sets it | Only endpoint sets it |
| Full Flag | If packet length bigger than MTU minus a certain reserved amount the port sets it | No |
| Fixed length flag | No | No |
| Validity bit | Potentially modified at each port taking part at the synchronization algorithm along the path | Potentially modified at each port taking part at the synchronization algorithm along the path |
| Reserved bit | No | No |
| Record_count | Incremented at each port if Full flag not set | Only endpoint increments it |
| Port_hop_count | Decremented at each port along the forward path | Decremented at each port along the forward path |
| Application_data | No | No |
| Streaming_timestamp | Potentially modified at each port taking part at the synchronization algorithm along the path | Potentially modified at each port taking part at the synchronization algorithm along the path |
| Scale | Potentially modified at each port taking part at the synchronization algorithm along the path | Potentially modified at each port taking part at the synchronization algorithm along the path |
| Auth Type | No | No |
| Authentication | No | No |

The techniques of the present invention can be implemented in a variety of devices such as routers and switches. In some examples, the reverse path delay estimation techniques can be implemented on any network device. In other examples, the techniques of the present invention can also be implemented at tunneling switches used to transmit storage application data over IP networks.

Figure 8:
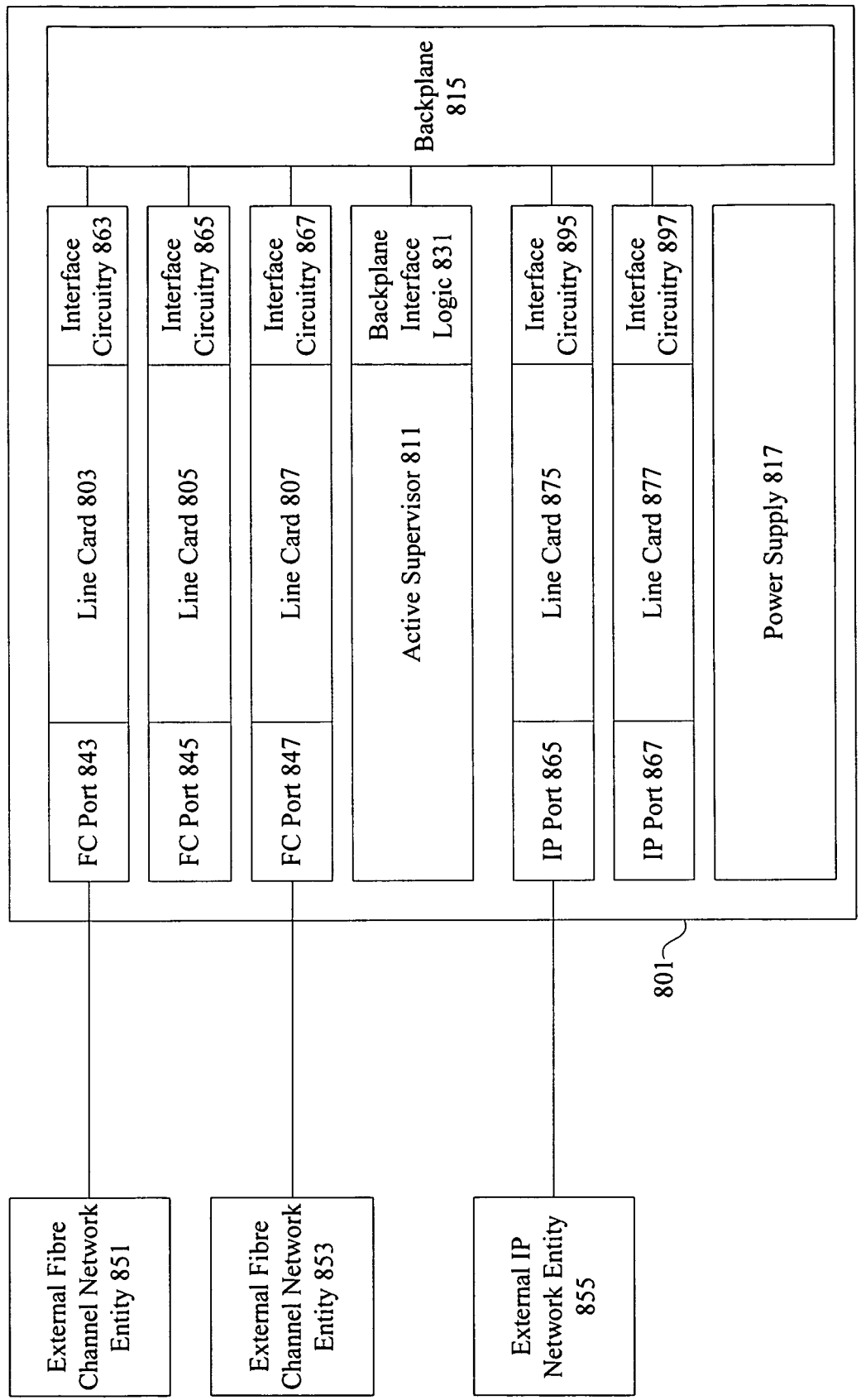
FIG. 8 is a diagrammatic representation showing a network device.

FIG. 8 is a diagrammatic representation of one example of a fibre channel switch that can be used to implement techniques of the present invention. Although one particular configuration will be described, it should be noted that a wide variety of switch and router configurations are available. The tunneling switch 801 may include one or more supervisors 811. According to various embodiments, the supervisor 811 has its own processor, memory, and storage resources.

Line cards 803, 805, and 807 can communicate with an active supervisor 811 through interface circuitry 883, 885, and 887 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, a routing application is configured to populate hardware forwarding tables used to direct frames towards their intended destination by choosing the appropriate output port and next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

According to various embodiments, the switch also includes line cards 875 and 877 with IP interfaces 865 and 867. In one example, the IP port 865 is coupled to an external IP network entity 855. The line cards 875 and 877 can also be coupled to the backplane 815 through interface circuitry 895 and 897.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for providing network metrics, the method comprising:
   receiving a metric measurement message at an ingress port associated with a network device, the metric measurement message including a plurality of timestamps, wherein the plurality of timestamps are generated by a plurality of network devices using Layer 2 applications and wherein the metric measurement message is a Layer 2 message and is encapsulated in a Layer 3 Internet Control Message Protocol (ICMP) packet;
   inserting a first timestamp into the metric measurement message after the metric measurement message is received at the ingress port, the first timestamp generated using a hardware clock associated with the network device;

inserting a second timestamp into the metric measurement message after the first timestamp is inserted and before the metric measurement message is transmitted at an egress port associated with the network device, the second timestamp generated using the hardware clock associated with the network device, wherein the first and second timestamps are generated by a Layer 2 application.

2. The method of claim 1, wherein the hardware clock is included in a line card associated with the network device.

3. The method of claim 1, further comprising inserting a third timestamp after inserting the first timestamp but before inserting the second timestamp, wherein the third timestamp is inserted into an Internet Control Message Protocol (ICMP) field.

4. The method of claim 3, wherein the first timestamp and the second timestamp are inserted by a layer 2 application while the third timestamp is inserted by a layer 3 application.

5. The method of claim 1, further comprising authenticating the metric measurement message using authentication information.

6. The method of claim 1, further comprising providing the metric measurement message to a layer 3 application for processing.

7. The method of claim 1, further comprising swapping source and destination addresses associated with the metric measurement message.

8. The method of claim 1, further comprising determining that a port hop count is zero.

9. The method of claim 1, wherein the metric measurement message includes a version flag, a direction flag, a full flag, and a port hop count.

10. The method of claim 9, wherein the port hop count is decremented at each port.

11. The method of claim 1, wherein the ingress port and the egress port are the same port.

12. A network device, comprising:
an ingress port operable to receive a metric measurement message, the metric measurement message including a plurality of timestamps, wherein the plurality of timestamps are generated by a plurality of network devices using Layer 2 applications and wherein the metric measurement message is a Layer 2 message and is encapsulated in a Layer 3 Internet Control Message Protocol (ICMP) packet;
an egress port operable to transmit the metric measurement message;
a timestamp mechanism operable to insert a first timestamp into the metric measurement message after the metric measurement message is received at the ingress port, the first timestamp generated using a hardware clock associated with the network device, wherein the timestamp mechanism is further operable to insert a second timestamp into the metric measurement message after the first timestamp is inserted and before the metric measurement message is transmitted at the egress port associated with the network device, the second timestamp generated using the hardware clock associated with the network device,
wherein the first and second timestamps are generated by a Layer 2 application.

13. The network device of claim 12, wherein the timestamp mechanism is included in a line card associated with the network device.

14. The network device of claim 12, further comprising a processor configured to insert a third timestamp after the first timestamp is inserted but before the second timestamp is inserted, wherein the third timestamp is inserted into an Internet Control Message Protocol (ICMP) field.

15. The network device of claim 14, wherein the first timestamp and the second timestamp are inserted by a layer 2 application while the third timestamp is inserted by a layer 3 application.

16. The network device of claim 12, further comprising authenticating the metric measurement message using authentication information.

17. An apparatus, comprising:
means for receiving a metric measurement message from a first network device, the metric measurement message including a plurality of timestamps, wherein the plurality of timestamps are generated by a plurality of network devices using Layer 2 applications and wherein the metric measurement message is a Layer 2 message and is encapsulated in a Layer 3 Internet Control Message Protocol (ICMP) packet;
means for inserting a first timestamp into the metric measurement message after the metric measurement message is received at the apparatus, the first timestamp generated using clock means associated with the apparatus;
means for inserting a second timestamp into the metric measurement message after the first timestamp is inserted and before the metric measurement message is transmitted by the apparatus, the second timestamp generated using clock means associated with the apparatus,
wherein the first and second timestamps are generated by a Layer 2 application.

* * * * *